United States Patent Office 3,443,884
Patented May 13, 1969

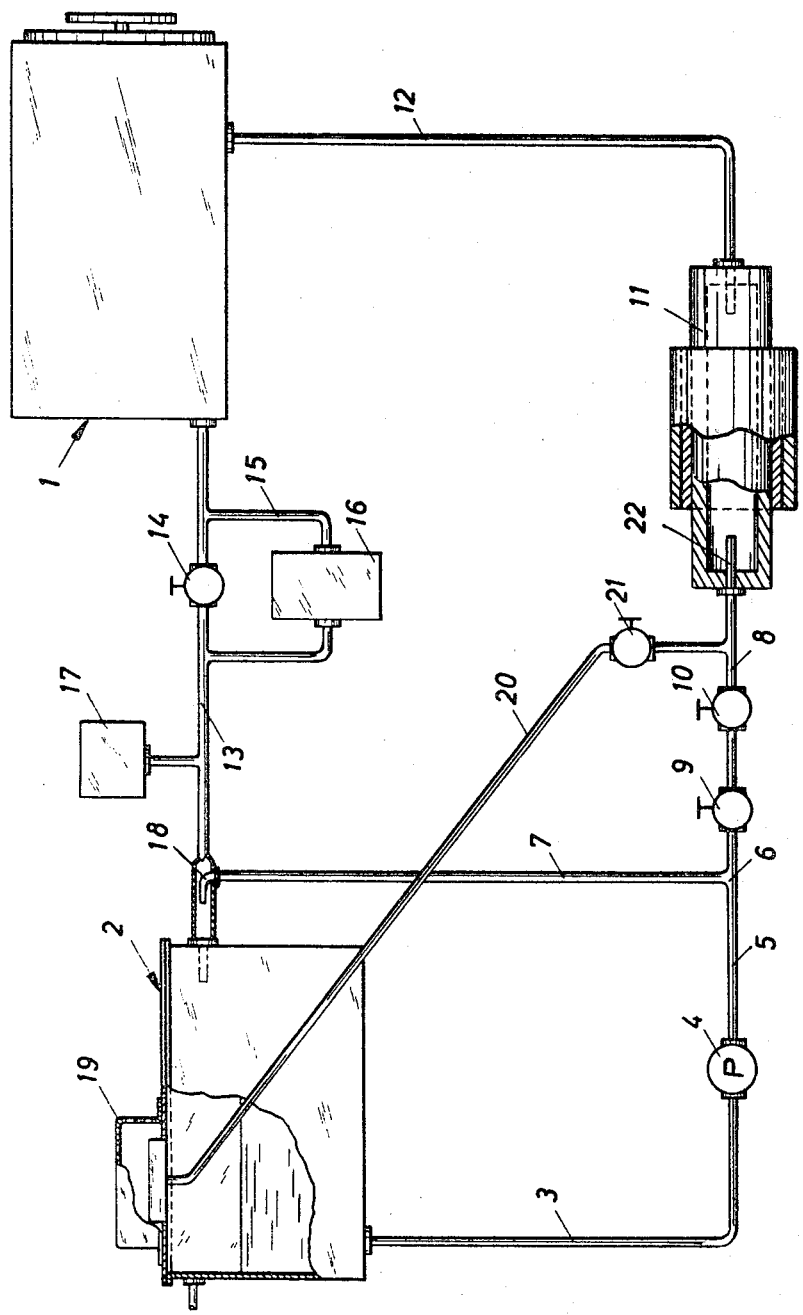

3,443,884
HEATED STERILIZING APPARATUS UTILIZING
A PRESSURE-TIGHT VESSEL
Fritz Linder, Skarhamn, Sweden
Filed Sept. 13, 1965, Ser. No. 486,910
Claims priority, application Sweden, Sept. 29, 1964,
11,672/64
Int. Cl. A61l 3/00
U.S. Cl. 21—93                                7 Claims

ABSTRACT OF THE DISCLOSURE

Apparatus for sterilizing articles, including a pressure-tight vessel connected in a series with a liquid supply container, a liquid feeding pump, a vaporizing device, and an evacuation pump. A source of air is connected to the sterilizing device to supply preheated air to the pressure vessel. Suitable valving allows selective control of the operating cycle of the apparatus.

---

This invention has reference to an improvement in autoclaves and similar pressure-tight vessels having on one hand an evacuation conduit and on the other hand a feeding conduit, the latter serving for feeding to the autoclave or the like, a pre-heating medium as well as a sterilization medium, preferably steam, and a post drying medium.

Many requirements are nowadays put on autoclaves, inter alia short sterilization time, dry sterilization goods and a preventing of reinfection at the equalising of the pressure. Researchers in recent times have shown that too high a water content in textile products to a considerable degree elongates the sterilization time. Certain materials, e.g. leather, can be damaged by too high a water content in connection with a high temperature.

So as to fulfill these requirements the invention is mainly characterised by a pump connected in a first part of the feeding conduit, said pump adapted to feed water from a container to a water jet pump in the evacuation conduit, said water jet pump adapted to create a negative pressure so as to expel the air in the autoclave and to feed to the same sterile and preferably pre-heated air, said first mentioned pump adapted to convey water to a heating device connected in a second part of said feeding conduit for the evaporation of the water in such a way that steam can be fed to the autoclave or the like, the invention being further characterised by a valve in said evacuation conduit and a valve in said second part of the feeding conduit, said valves serving for controlling the pressure in said autoclave.

For the purpose of illustration the invention will now be described with reference to the accompanying drawing showing diagrammatically a device according to the invention.

As viewed in the drawing the device according to the invention comprises the autoclave 1 proper and a water container 2 as well as tube conduits interconnecting the autoclave and the container. Included in these conduits are valves, a pump and a heat accumulator and the invention is to be seen in the special arrangement of these details. Thus, from the container there issues a conduit 3 extending to a pump 4 and from the latter there extends a conduit 5 which at the point 6 is branched in the conduit 7 and in the conduit 8. A reducing valve 9 and a control valve 10 are connected in last mentioned conduit 8. The conduit 8 leads to heat chamber 11 which is connected in a feeding pipe 12 to the autoclave 1. Further, from the autoclave 1 there extends a conduit 13 serving for the evacuation of the autoclave 1 and extending to the water vessel or container 2. A valve 14 is connected in the conduit 13, said valve 14 being bridged by a by-pass conduit 15 with a selectivity valve 16. A vacuum accumulator 17 is further connected to the conduit 13. The end of the conduit 7 extending into the conduit 13 includes a water jet 18 which, upon water being passed through it, creates a negative pressure in the conduit 13 and the autoclave 1. A conduit 20 extends from a filter 19 in the vessel 2 to a point on the conduit 8 between the valve 10 and the heat accumulator 11. A volume control valve 21 is included in the conduit 20. The conduit 20 is provided with a throttle mouth-piece which renders possible a control of the quantity of air fed to the autoclave through the filter 19, the conduit 20, the valve 21, the heat chamber 11 and the conduit 12.

The operation of the device according to the invention could be considered as composed of five stages, viz.

(a) pre-heating,
(b) creation of a pressure in the autoclave,
(c) sterilization with pressure alternation,
(d) post-drying and
(e) pressure equalisation.

These steps or phases will be described separately in the following.

Pre-heating

During the preheating phase the pump 4 is operating, the valve 10 is closed and the valves 21 and 14 are open. Water is then fed through the conduits 3, 5, and 7 to the water jet pump 18 in such a way that a negative pressure is created in the conduit 13. Air is then sucked through the filter 19, the conduit 20, the heating chamber 11 where it is heated and sterilized, and further through the conduit 12 to the autoclave 1 in such a way that the air in said autoclave 1 is pressed out and replaced by heated sterile air. Also the sterilization goods are pre-heated in an effective manner.

The creation of pressure

The pump 4 is operating and the valves 14 and 21 are closed. The valve 10 is open and by means of the reducing valve 9 the pressure to be created in the autoclave 1 is adjusted to the desired value. Also in this case water flows to the ejector pump 18. Through the conduit 8 water streams into the heating chamber 11 where it is sprayed through the mouth piece 22 and evaporated. The steam then obtained, which may be dried but should not be over-heated, streams further through the conduit 12 to the autoclave 1 and presses away the air in the autoclave which air escapes through the conduit 15 with the selectivity valve 16, the conduit 13, and the water jet pump 18 to the container 2. Due to the pre-heating of the air, the negative pressure created by the water jet pump 18 in the conduit 13 and the positive pressure in the conduit 12, this procedure is carried out very quickly. As soon as steam starts to stream through the selectivity valve 16, the latter is heated and closes, and thereupon the pressure increases very quickly in the autoclave 1 as no energy is used up for the formation of condensed water. The pressure in the autoclave 1 will automatically be adjusted to the same pressure as that in the conduit 8.

Sterilization with pressure alteration

By means of an alternative opening and closing of the valves 10 and 14 one can, in a simple way, obtain quick and great pressure alterations. This accelerates the sterilization, inter alia thereby that air enclosures are loosened and removed in such a way that they do not any longer have any detrimental influence on the sterilization.

In reducing the pressure in the autoclave, the valves 10 and 21 are closed and the valve 14 is opened so that the positive pressure in the autoclave 1 is released through the evacuation conduit 13 via the open valve 14 and there is obtained a drying of the sterilization goods. Because the pump 4 is in operation during the whole of the sterilization procedure, it is advantageous to connect a negative pressure accumulator 17 in the conduit 13. Since the accumulator 17 accumulates negative pressure during the entire sterilization time, the momentary creation of negative pressure is increased at the pressure reduction, and thus there is also obtained a shortening of the sterilization time.

Post-drying

The throttling mouth piece in the conduit 20 makes it possible to adjust the air quantity through the conduit 20 in relation to the heat capacity of the heating chamber 11 and the suction capacity of the water jet pump 18, and thereby results in an optimal post-drying of the sterilization goods in an unusual short time. The sterile hot air feeds namely, due to the above described combination, a heat quantity to the sterilization goods which is required for a quick water evaporation under negative pressure.

In the post-drying phase, the valve 10 is closed and the valves 14 and 21 are open. The air fed to the autoclave 1 is controlled by the throttle valve in the conduit 20 in correspondence with the negative pressure created in the autoclave by the water jet pump 18 so that the sterilization goods are heated to the required degree for drying simultaneously as the negative pressure required for drying is maintained.

Negative pressure equalisation

The valves 10 and 14 are closed and then the pressure equalisation takes place through the filter 19, the conduit 20, the opened valve 21, the heating chamber 11, and the conduit 12 whereupon the air is sterilized in the heating chamber 11 and a reinfection of the goods is prevented.

As obvious from the above description, the present invention offers the advantage that there is obtained a quick and effective sterilization without any risk for reinfection of the sterilization goods.

The invention has been described in the aforegoing for the purpose of illustration only and is not intended to be restricted by this description or otherwise except as defined in the appended claims. Thus, many modifications could be carried out within the scope of the appended claims and the conduit 20 does not necessarily have to connect at one end to a filter 19 and the latter does not have to be arranged in the container 2, even though a filter of course increases the safety of the sterilization procedure and for construction purposes is advantageously arranged as shown. Of course, any suitable liquid which may be evaporated easily may be used in the apparatus. A large number of easily-boiling liquids which are well known are available for this purpose and such liquids may be even more suitable than water in special cases. The autoclave is especially suited for a quick sterilization of surgeons' instruments or the like.

What I claim is:

1. A sterilizing apparatus comprising a pressure-tight vessel, a liquid supply container, heating means for producing a vapor from a liquid for supply to the vessel and for preheating air for supply to the vessel, a liquid feeding conduit having a first portion leading from the container to the heating means and a second portion leading from the heating means to the vessel, an evacuation conduit leading from the vessel, liquid jet means in the evacuation conduit for creating a negative pressure therein and in the vessel, whereby the vessel is evacuated and the preheated air and the vapor medium are drawn into the vessel, a third conduit connecting the first portion of the feeding conduit to the liquid jet means, pump means in the first portion of the feeding conduit between the container and the third conduit for feeding the liquid to the liquid jet means and the heating means, first valve means in the evacuation conduit, second valve means interposed in the first portion of the feeding conduit between the third conduit and the heating means, the first and second valve means being adjustable to control the pressure in the vessel, and a source of air connected to the heating means.

2. A sterilizing apparatus comprising a pressure-tight vessel, a water supply container, heating means for producing steam from water for supply to the vessel and for preheating air for supply to the vessel, a water feeding conduit having a first portion leading from the container to the heating means and a second portion leading from the heating means to the vessel, an evacuation conduit leading from the vessel, water jet means in the evacuation conduit for creating a negative pressure therein and in the vessel, whereby the vessel is evacuated and the preheated air and steam are drawn into the vessel, a third conduit connecting the first portion of the feeding conduit to the water jet means, pump means in the first portion of the feeding conduit between the container and the third conduit for feeding water to the water jet means and the heating means, first valve means in the evacuation conduit, second valve means interposed in the first portion of the feeding conduit between the third conduit and the heating means, the first and second valve means being adjustable to control the pressure in the vessel, and a source of air connected to the heating means.

3. A sterilizing apparatus comprising a pressure-tight vessel, a water supply container, heating means for producing steam from water for supply to the vessel and for preheating air for supply to the vessel, a water feeding conduit having a first portion leading from the container to the heating means and a second portion leading from the heating means to the vessel, an evacuation conduit leading from the vessel, water jet means in the evacuation conduit for creating a negative pressure therein and in the vessel, whereby the vessel is evacuated and the preheated air and steam are drawn into the vessel, a third conduit connecting the first portion of the feeding conduit to the water jet means, pump means in the first portion of the feeding conduit between the container and the third conduit for feeding water to the water jet means and the heating means, first valve means in the evacuation conduit, second valve means interposed in the first portion of the feeding conduit between the third conduit and the heating means, the first and second valve means being adjustable to control the pressure in the vessel, a by-pass conduit connected to the evacuation conduit and bridging the first valve means, selectivity valve means in the by-pass conduit, the selectivity valve means being adapted to close upon the passage of steam therethrough, and a source of air connected to the heating means.

4. A sterilizing apparatus comprising a pressure-tight vessel, a water supply container, heating means for producing steam from water for supply to the vessel and for preheating air for supply to the vessel, a water feeding conduit having a first portion leading from the container to the heating means and a second portion leading from the heating means to the vessel, an evacuation conduit leading from the vessel, water jet means in the evacuation conduit for creating a negative pressure therein and in the vessel, whereby the vessel is evacuated and the preheated air and steam are drawn into the vessel, a third conduit connecting the first portion of the feeding conduit to the water jet means, pump means in the first portion of the feeding conduit between the container and the third conduit for feeding water to the water jet means and the heating means, first valve means in the evacuation conduit, second valve means interposed in the first portion of the feeding conduit between the third conduit and the heating means, the first and second valve means being adjustable to control the pressure in the vessel, reducing valve means in the first portion of the feeding conduit between the third conduit and the heating means for adjusting the pressure in the vessel to the desired level, and a source of air connected to the heating means.

5. A sterilizing apparatus comprising a pressure-tight vessel, a water supply container, heating means for producing steam from water for supply to the vessel and for preheating air for supply to the vessel, a water feeding conduit having a first portion leading from the container to the heating means and a second portion leading from the heating means to the vessel, an evacuation conduit leading from the vessel, water jet means in the evacuation conduit for creating a negative pressure therein and in the vessel, whereby the vessel is evacuated and the preheated air and steam are drawn into the vessel, a third conduit connecting the first portion of the feeding conduit to the water jet means, pump means in the first portion of the feeding conduit between the container and the third conduit for feeding water to the water jet means and the heating means, first valve means in the evacuation conduit, second valve means interposed in the first portion of the feeding conduit between the third conduit and the heating means, the first and second valve means being adjustable to control the pressure in the vessel, a by-pass conduit connected to the evacuation conduit and bridging the first valve means, selectivity valve means in the by-pass conduit, the selectivity valve means being adapted to close upon the passage therethrough of steam, reducing valve means in the first portion of the feeding conduit between the third conduit and the heating means for adjusting the pressure in the vessel to the desired level, and a source of air connected to the heating means.

6. A sterilizing apparatus comprising a pressure-tight vessel, a water supply container, heating means for producing steam from water for supply to the vessel and for preheating air for supply to the vessel, a water feeding conduit having a first portion leading from the container to the heating means and a second portion leading from the heating means to the vessel, an evacuation conduit leading from the vessel, water jet means in the evacuation conduit for creating a negative pressure therein and in the vessel, whereby the vessel is evacuated and the preheated air and steam are drawn into the vessel, a third conduit connecting the first portion of the feeding conduit to the water jet means, pump means in the first portion of the feeding conduit between the container and the third conduit for feeding water to the water jet means and the heating means, first valve means in the evacuation conduit, second valve means interposed in the first portion of the feeding conduit between the third conduit and the heating means, the first and second valve means being adjustable to control the pressure in the vessel, a source of air connected to the heating means, the connection between the source of air and the heating means including an air conduit containing a sterilization filter and a valve for adjusting the flow of air through the air conduit.

7. A sterilizing apparatus comprising a pressure-tight vessel, a water supply container, heating means for producing steam from water for supply to the vessel and for preheating air for supply to the vessel, a water feeding conduit having a first portion leading from the container to the heating means and a second portion leading from the heating means to the vessel, an evacuation conduit leading from the vessel, water jet means in the evacuation conduit for creating a negative pressure therein and in the vessel, whereby the vessel is evacuated and the preheated air and steam are drawn into the vessel, a third conduit connecting the first portion of the feeding conduit to the water jet means, pump means in the first portion of the feeding conduit between the container and the third conduit for feeding water to the water jet means and the heating means, first valve means in the evacuation conduit, second valve means interposed in the first portion of the feeding conduit between the third conduit and the heating means, the first and second valve means being adjustable to control the pressure in the vessel, a vacuum accumulator connected to the evacuation conduit, and a source of air connected to the heating means.

References Cited

UNITED STATES PATENTS 1,800,302  4/1931  Linde.
3,107,975  10/1963  Linder _____ 21—94

MORRIS O. WOLK, *Primary Examiner.*

B. S. RICHMAN, *Assistant Examiner.*

U.S. Cl. X.R.

21—56, 94, 103, 104